2,963,503
PROCESS FOR PRODUCING PHOSPHORUS-CONTAINING ORGANOSILICON COMPOUNDS

James G. Marsden, Tonawanda, N.Y., assignor to Union Carbide Corporation, a corporation of New York No Drawing. Filed Dec. 23, 1958, Ser. No. 782,378

11 Claims. (Cl. 260—448.8)

This invention relates in general to an improved process for the production of phosphorus-containing organosilicon compounds. More particularly, this invention is concerned with an improved process for the production of phosphorus-containing organosilicon compounds wherein the phosphorus is bonded to the silicon atom through a saturated divalent aliphatic or alicyclic hydrocarbon group containing at least two carbon atoms.

In the preparation of phosphorus-containing organosilicon compounds by one of the heretofore known methods, i.e. the addition of a quinquevalent phosphorus compound containing a phosphorus-bonded hydrogen atom to an ethylenically unsaturated organosilicon compound, the yields of the phosphorus-containing organosilicon compounds are low, i.e. in the range of from about 10 to about 40% by weight based on the starting materials. Phosphorus-containing organo siloxanes can also be prepared according to the well known Michaelis-Arbuzov reaction employing haloalkylsiloxane and the ester of an acid of trivalent phosphorus. In the preparation of phosphorus-containing organosiloxanes according to the latter reaction the reaction times are usually long.

It is therefore an object of this invention to provide an improved process for the production of phosphorus-containing organosilicon compounds, whereby the yields of said phosphorus-containing organosilicon compounds are substantially increased and whereby the reaction time is substantially decreased. Other objects of this invention will be apparent from the description of the invention given hereinafter.

The process of producing phosphorus-containing organosilicon compounds of which this invention is an improvement involves the reaction of a phosphorus compound containing one quinquevalent phosphorus atom which has one hydrogen bonded to phosphorus with a silicon compound containing at least one silicon atom and at least one ethylenically unsaturated aliphatic or alicyclic hydrocarbon group attached to silicon. The process is carried out under the influence of a catalyst which causes the addition of the phosphorus compound to the double bond of the ethylenically unsaturated aliphatic or alicyclic hydrocarbon group of the silicon compound, thus yielding the phosphorus-containing organosilicon compound product. The reaction is represented by the equation:

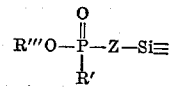

where

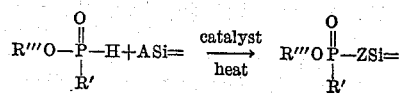

is the phosphorus compound starting material, R''' is a hydrocarbyl group or a halogenated hydrocarbyl group, R' is hydrogen, a hydrocarbyl, a halogenated hydrocarbyl, a hydrocarbyloxy or a halogenated hydrocarbyloxy group. ASi≡ is the silicon compound starting material wherein A is a monovalent ethylenically unsaturated aliphatic or alicyclic hydrocarbon group having from 2 to 18 carbon atoms and

is the the phosphorus-containing organosilicon compound wherein Z is a divalent saturated aliphatic or alicyclic hydrocarbon group preferably having not more than 18 carbon atoms.

I have found that the manner in which the reaction is conducted greatly influences the yield of product obtained. For example, if the silicon compound starting material and the phosphorus compound starting material is mixed and heated and the catalyst added either in small increments or as one charge, the yield of the phosphorus-containing organosilicon compound is in the range of from 10 to 40% according to a previously disclosed process. It has further been found that if the silicon compound starting material, phosphorus compound and catalyst are mixed and then heated, the yield of phosphorus-containing organosilicon compounds is in the range of from 10 to 40%. However, I have found that yields in the range of from 50% to 80 or 90%, and in most instances yields greater than 60% can be obtained by forming a mixture of the silicon compound starting material and a free radical addition catalyst and adding said mixture slowly to the phosphorus compound, said phosphorus compound having been previously heated to a temperature sufficiently elevated to cause said phosphorus compound and said silicon compound starting material to react.

According to my improved process for the production of phosphorus-containing organosilicon compounds, the reaction is conducted according to the following procedure:

A mixture of the silicon compound starting material and the catalyst is prepared. The phosphorus compound starting material is charged into a reaction flask and heated to a temperature sufficiently elevated to cause the phosphorus compound and the silicon compound to react. The silicon compound-catalyst mixture is then added slowly to the phosphorus compound starting material with stirring while maintaining the phosphorus compound starting material at a temperature at which the said phosphorus compound reacts with said silicon compound under the influence of the catalyst to produce the phosphorus-containing organosilicon compound product.

The phosphorus compound employed as starting materials in my process are those containing a quinquevalent phosphorus atom to which is bonded one hydrogen atom. These phosphorus compounds are represented by the formula:

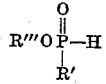 (1)

wherein R''' and R' have the above defined meanings.

By the term "hydrocarbyl" as employed herein is meant a monovalent hydrocarbon group, i.e., a monovalent group composed of carbon and hydrogen. Thus, halohydrocarbyl designates a monovalent hydrocarbon group which is substituted with halogen, i.e. XR'''', where X is halogen and R'''' is the hydrocarbon group; hydrocarbyloxy designates a monovalent hydrocarbon group attached to ether oxygen, i.e. RO— where R is the hydrocarbon group, and halohydrocarbyloxy designates a monovalent hydrocarbon group which is substituted with halogen and attached to ether oxygen, i.e. XR'''O—.

The silicon compounds employed as starting materials in the process of this invention contain at least one silicon atom and at least one unit of the formula:

$$A-Si\equiv$$

wherein A is as defined above and each silicon atom is bonded to from one to three oxygen atoms which are bonded to no other element than silicon or carbon of a hydrocarbyl group and each remaining unfilled valence of each silicon atom being satisfied by no other group than an A group, a hydrocarbyl group or a halogenated hydrocarbyl group.

Mole ratios of the phosphorus compound and silicon compound employed as starting materials in the process of this invention are not narrowly critical. Stoichiometric amounts as shown by the above equation are preferred for efficient reaction and ease of product recovery. For example, one mole of the phosphorus compound is preferred for each mole of ethylenic unsaturation in the silicon compound desired to be reacted. Other than stoichiometric amounts of the phosphorus compound of the ethylenically unsaturated silicon compound can also be used. In calculating stoichiometric amounts of phosphorus compounds having 2 hydrogen atoms bonded thereto, for the purposes of this invention only one such phosphorus-bonded hydrogen atom takes part in the reaction.

The catalysts which can be advantageously employed in the process of this invention include the free radical producing catalysts, e.g., the organic peroxides and azo compounds. Specific examples of organic peroxide catalysts operative herein include ditertiary butyl peroxide, dibenzoyl peroxide, diacetyl peroxide, dicumyl peroxide, tertiary butyl peracetate, tertiary butyl perbenzoate, 2,4-dichlorobenzoyl peroxide, and the like. Specific examples of azo compounds which are used herein include alpha, alpha'-azodiisobutyronitrile, 2,2'-dicyanoazobenzene and the like. Without wishing to be bound by any one particular theory, it is believed that the reaction proceeds by a free radical mechanism, as the catalysts employed are known catalysts for reactions involving unsaturated organic compounds which proceed by a free radical mechanism. Thus, the catalysts useful in the process of this invention can be termed free radical addition catalysts. The concentration of catalyst is not narrowly critical. Advantageous catalyst concentrations are those in the range from 0.5 to 10% by weight based on the weight of the starting materials, i.e. the ethylenically unsaturated organosilicon compound and phosphorus compound. A catalyst concentration of from 2 through 10% by weight based on the weight of the starting materials is preferred.

The temperatures at which the improved process of this invention is carried out can range from 50° C. to 250° C., depending upon the rate of decomposition of the particular free radical catalyst employed. The temperature must be sufficiently elevated to form free radicals from the catalyst and should be chosen so that the free radical formed has a reasonable half-life. With the more active organic peroxide catalysts, such as for example, dibenzoyl peroxide, tertiary butyl perbenzoate, and the like, temperatures of from 50° C. to 100° C. are preferred. When a less active organic peroxide catalyst is used, for example, ditertiary butyl peroxide, temperatures of from 100° C. to 180° C. can be employed. However, with the latter catalyst a temperature range of from 120° C. to 160° C. is preferred.

The pressure at which the improved process of this invention is carried out is not narrowly critical. Pressures above or below atmospheric can be used if desired; however, it is preferred for convenience that the process be carried out at atmospheric pressure. When one or more of the reactants is too volatile for practical reaction at atmospheric pressure, the reaction can conveniently be run at superatmospheric pressure in a pressure vessel.

A solvent is not necessary in the process of this invention; however, a solvent can be employed as desired for convenience and ease of handling. For example, when high molecular weight ethylenically unsaturated polysiloxanes are used as the silicon compound starting materials, a solvent can be advantageously employed to provide a homogeneous system. The solvent employed should be selected so that it is non-reactive toward the reactants and catalysts. Solvents such as benzene, toluene, and the like are useful.

The silicon compound starting materials used in the practice of the present improved process are organosilicon compounds containing at least one unit of the formula:

$$\equiv Si-A$$

wherein A is defined above, each silicon atom is bonded as described above and the remaining unfilled valences of each silicon is satisfied as described above. For example, A can be vinyl, allyl, butenyl, decenyl, octadecenyl, and the like, or A can be an alicyclic group containing ethylenic unsaturation such as cyclohexenyl, bicycloheptenyl, and the like.

The silicon compound starting materials used in this invention include organosilanes which are mono-, di-, and tri-functional in regard to the silicon atom. These organosilanes are those having the formula:

$$(R'')_n\overset{A_m}{Si}(OR)_{4-m-n} \qquad (2)$$

where A has the above-defined meaning, R'' is a hydrocarbyl group or a halogenated hydrocarbyl group, R is a hydrocarbyl group, n is an integer of from 0 through 2, (m) is an integer of from 1 through 3 and the sum of $m+n$ is not greater than 3. Illustrative of the monovalent hydrocarbon radicals as represented by R and R'' are methyl, ethyl, stearyl, cyclohexyl, phenyl, naphthyl, phenylethyl, ethylphenyl, and the like. Illustrative of the halogenated monovalent hydrocarbon radicals as represented by r'' are the halogenated derivatives of the monovalent hydrocarbon radicals illustrated above, for example, chloropropyl, bromophenyl, fluorophenyl, and the like. Wherever employed herein, the radicals represented by R' and R'' preferably each contain from 1 through 18 carbon atoms. Organosilanes which are monofunctional insofar as the silicon atoms is concerned are, for example, vinyl(dimethyl) ethoxysilane, butenyl(diethyl) propoxysilane, vinyl(diphenyl)ethoxysilane, and the like. Organosilanes which are difunctional insofar as the silicon atom is concerned are, for example, the dialkoxysilanes, such as phenyl(vinyl)diethoxysilane, methyl(allyl)dipropoxysilane, methallyl(ethyl)dimethoxysilane, butenyl(methyl)diethoxysilane, and the like. Organosilanes which are trifunctional insofar as the silicon atom is concerned are for example, the trialkoxysilanes such as vinyltriethoxysilane, allyltrimethoxysilane, cyclohexenyltriethoxysilane, butenyl-tripropoxysilane, methallyltriethoxysilane, 9-octadecenyltriethoxysilane, and the like.

The silicon compound starting materials in the present invention also include polysiloxanes containing at least one unit of the formula:

$$R''_n\overset{A_m}{Si}O_{\frac{4-m-n}{2}} \qquad (3)$$

wherein R'', A, (m) and (n) have the above-defined meanings. These polysiloxanes include those composed of only units of the above Formula 3 and in addition those containing at least one unit of the above Formula 3 interconnected with each other and units represented by the formula:

$$R''_xSiO_{\frac{4-x}{2}} \qquad (4)$$

where R'' is as above-defined and x is an integer of from 0 through 3. Wherever employed herein in describing polysiloxanes the integers as represented by (m), (n), and ($x$) each individually can be the same or different throughout the same polysiloxane molecule but must be the same throughout the same siloxane unit. The symbols R, R', R'', A, Z, and Y, also wherever employed herein in describing phosphorus compounds, polysiloxanes, and/or silanes each can be the same or different throughout the same molecule. Examples of polysiloxanes which are employed as starting materials herein include the cross-linked or trifunctional siloxanes, e.g. vinylpolysiloxanes, cyclohexenylpolysiloxane, allylpolysiloxane, and the like; difunctional polysiloxanes, e.g. cyclic siloxanes, such as tetra methyl tetravinyl cyclotetrasiloxane, tetrallyltetraphenylcyclotetrasiloxane, and the like; and linear siloxanes such as methyl(vinyl)polysiloxane, cyclohexenyl-(ethyl)polysiloxane, and the like; trifunctional copolymers of phenylpolysiloxane, and vinylpolysiloxane, ethylpolysiloxane and allylpolysiloxane, methylpolysiloxane and cycohexenylpolysiloxane, and the like; or difunctional cyclic or linear copolymers such as the cyclosiloxanes, e.g. cyclohexenylheptamethylcyclotetrasiloxane, divinylhexamethylcyclotetrasiloxane, allylpentamethylcyclotetrasiloxane, and the like; or linear copolymers of phenylvinylsiloxane and dimethylsiloxane, linear copolymers of allylmethylsiloxane and diethylsiloxane, and the like, and the linear trihydrocarbylsiloxanes, end-blocked siloxanes such as a trimethylsiloxy end-blocked copolymer of phenylmethylsiloxane, and methylvinylsiloxane, and triphenylsiloxy end-blocked copolymer of methylcyclohexenylsiloxane and dimethylsiloxane and the like.

The phosphorus compounds employed as starting materials are those described above and include phosphinates and phosphonates.

Phosphinates are represented by the formulas $(RO)P(O)H_2$, and $(RO)RP(O)H$ and are illustrated by $(C_6H_5O)P(O)H_2$, $(xylyloxyP(O)H_2$, $(C_6H_5)(C_8H_{17}O)P(O)H$, $(C_2H_5O)(C_6H_5)P(O)H$, $(C_4H_9O)(C_6H_5)P(O)H$. Phosphonates are represented by the formula $(RO)_2P(O)H$ and are illustrated by $(C_2H_5O)(C_6H_{13}O)P(O)H$, $(C_4H_9O)_2P(O)H$, $(CH_3O)_2P(O)H$, $(C_2H_5O)_2P(O)H$, $(C_8H_{17}O)_2P(O)H$, $(C_6H_5O)_2P(O)H$, $(xylyloxy)_2P(O)H$, $(ClCH_2CH_2O)_2P(O)H$ $(4\text{-}ClC_6H_4O)_2P(O)H$, and the like. The preferred phosphinates and phosphonates are those containing only one phosphorus bonded hydrogen. The nomenclature employed herein to designate phosphorus compounds is in accordance with the rules of naming compounds containing one phosphorus atom as approved by the general nomenclature committee of the Organic Division of the American Chemical Society and as published in Chemical and Engineering News, volume 30, number 43, pages 4515 through 4522 (October 27, 1952). The use of "(O)" in the formulas herein designates oxygen which is bonded to only phosphorus, e.g. P=O, and no differentiation is being made herein between →O (or semipolar linkage) and =O (or double bond linkage). In many instances the phosphonates exist in the tautomeric form as the diesters of phosphorus acid, e.g. $(RO)_2POH$. In these instances such diesters are equivalent to the phosphonates and are used in place of said phosphonates in my process.

The phosphorus-containing organosilicon compounds produced by the process of this invention are those containing at least one unit of the formula:

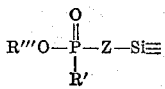

where R, R', and Z are as described above, each silicon is bonded as described above and the unfilled valences of each silicon are satisfied as previously described. These phosphorus-containing organosilicon compounds are monomeric, polymeric, and copolymeric and include the hydrolyzable silanes and the polysiloxanes.

The monomeric phosphorus-containing organosilicon compounds produced by the process of this invention include the hydrolyzable phosphorus-containing organosilanes represented by the formula:

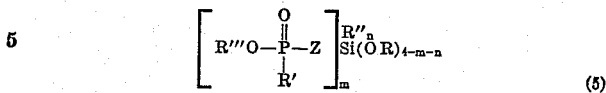

where R, R', R'', R''', Z, ($m$) and ($n$) have the above-defined meanings.

The polymeric phosphorus-containing organosilicon compounds produced by the process of this invention include the phosphorus-containing organopolysiloxanes containing the unit represented by the formula:

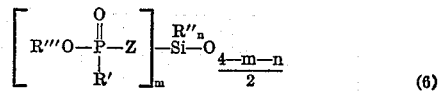

where R', R'', R''', Z, ($m$) and ($n$) have the above-defined meanings. The phosphorus-containing organopolysiloxanes produced by the process of this invention include those organosiloxanes having only units of Formula 6 and, in addition, those organosiloxanes having at least one unit of Formula 6 in combination with one or more units of Formula 4. These phosphorus-containing organopolysiloxanes include the linears, cyclics, and cross-linked polysiloxanes.

Illustrative of the hydrolyzable phosphorus-containing organosiloxanes that are prepared by the process of this invention include, for example,

[beta-(dimethoxyphosphinyl)ethyl]triethoxysilane,
[gamma - (di-2-ethylhexoxy)phosphinyl)propyl]trimethoxysilane,
[(ethoxy)hexoxyphosphinylbutyl]methyldipropoxysilane,
[beta-(butoxyamyloxy)phosphinyl)ethyl]phenyldiethoxysilane,
[beta-(diethoxyphosphinyl)ethyl]triethoxysilane,
[beta-(dibutoxyphosphinyl)ethyl]triethoxysilane,
[beta-(diethoxyphosphinyl)ethyl]methyldiethoxysilane,
[beta-(dimethoxyphosphinyl)ethyl]methyldiethoxysilane,
[gamma-(diethoxyphosphinyl)propyl]triethoxysilane,
[beta-di-2-ethylhexoxyphosphinyl)ethyl]methyldiethoxysilane,
[beta-(dimethoxyphosphinyl)ethyl]phenyldiethoxysilane,
[beta-(dimethoxyphosphinyl)ethyl]dimethylethoxysilane,
[beta-(diphenoxyphosphinyl)ethyl]triethoxysilane,
[beta-(diphenoxyphosphinyl)ethyl]methyldiethoxysilane,
[beta-(diphenoxyphosphinyl)ethyl]dimethylethoxysilane,
(dimethoxyphosphinylbutyl)triethoxysilane,
(dimethoxyphosphinylpropyl)-triethoxysilane,
[beta-(bis(beta-chloroethoxy)phosphinyl)ethyl]phenyldiethoxysilane,
[beta-(dibutoxyphosphinyl)ethyl]diphenylethylsilane,
bis[beta-(dibutoxyphosphinyl)ethyl]diethoxysilane,
and the like.

The phosphorus-containing organosilicon compounds made by the process of this invention are useful as lubricants and lubricant additives. These compounds are also useful as intermediates in the preparation of polysiloxane oils, resins, and elastomers which are useful as lubricants and coating materials. The hydrolyzable phosphorus-containing silanes made by the process of this invention can be hydrolyzed and condensed alone or with other hydrolyzable silanes to form cyclic, linear, and cross-linked polysiloxanes containing units of the Formula 6 alone or in combination with units of the Formula 4. The hydrocarbyloxy groups, R'O—, bonded to phosphorus and the hydrolyzable phosphorus-containing silanes can also be hydrolyzed during hydrolysis and condensation to the polysiloxane-silicon bonded hydrocarbyloxy groups have been found to hydrolyze.

The following examples serve to further illustrate my invention and are not to be construed as limitations thereon.

Example 1

The reaction was carried out in a 1000 ml. round-bottom flask fitted with a reflux condenser, drying tube, and dropping funnel. Dimethyl phosphonate, $(CH_3O)_2P(O)H$, (2.0 moles, 220 g.) was placed in the flask and heated to 140° C. A mixture of di-t-butyl peroxide (19.2 g.) in methyl(vinyl)diethoxysilane, (2.0 moles, 320 g.) was added from the dropping funnel over a 1-hour period while the temperature was maintained at 140° C.–160° C. Heating was continued for 1 hour after the addition was complete. The reaction mixture was fractionated in a short column packed with glass helices. [Beta-(dimethoxyphosphinyl)-ethyl]methyldiethoxysilane (389.8 g., 72% yield), $$(CH_3O)_2P(O)C_2H_4Si(OC_2H_5)_2$$

was obtained. Elemental analysis gave the following results:

Found: C—40.0; Si—10.6; P—11.5; M.W. 370. Calculated: C—40.0; Si—10.4; P—11.5; M.W. 270±.

The compound was verified as being [beta-(dimethoxyphosphinyl)-ethyl]methyldiethoxysilane by infrared and elemental analysis. [Beta-(dimethoxyphosphinyl)ethyl]methyldiethoxysilane was found to boil at about 125.5 to 129° C. at 3.0 mm. Hg and have an $n_D^{25}$ of 1.4288.

Example 2

Dimethyl phosphonate (220 g., 2.0 moles) was charged into a 1-liter, three-necked, round bottom flask fitted with a mechanical stirrer, dropping funnel, drying tube, and a reflux condenser. The phosphonate was heated to 140° C. A mixture of vinyltriethoxysilane (380 g., 2.0 moles) and ditertiarybutyl peroxide (19.2 g.) was placed in the dropping funnel and added to the heated phosphonate over a 1-hour period with stirring while maintaining the temperature between 140° C. and 160° C. The heating was continued for an additional hour after the addition was completed. The mixture was distilled through a Vigreaux column to yield [(dimethoxyphosphinyl)ethyl]triethoxysilane (374 g., 62.3% yield ) (B.P. 142.5–143° C. at 5.5 mm. Hg, $n_D^{25}$ 1.4230), which gave the following analysis:

Calculated for $C_{10}H_{25}SiO_6P$: 10.3% P; 9.35% Si. Found: 10.0% P; 9.1% Si.

Example 3

To a 500 cc. flask equipped with dropping funnel, mechanical stirrer, reflux condenser, and thermometer was added octyl phenylphosphinate, $$(C_6H_5)(C_8H_{17}O)P(O)H$$

(0.2 mole, 50.8 g.). The phosphinate was heated to 140° C. A solution of vinyltriethoxysilane 0.2 mole, 38.0 g.) and di-tertiarybutyl peroxide was added dropwise while the reaction mixture was maintained at 140–155° C. The reaction mixture was then heated to 166° C. and maintained at this temperature for 1½ hours. The mixture was fractionated through a 12″ x 3/3″ column packed with "Heli-Pak" and [(phenyl)octyloxyphosphinylethyl]triethoxysilane, $[C_6H_5(C_8H_{17}O)P(O)C_2H_4Si(OC_2H_5)_3]$ (60.9 g., $n_D^{25}$ 1.4770–1.4802, B.P. 211–215° C. at 1.0 mm. Hg) was obtained in 69% yield. This product gave the following analysis:

Calculated for $C_{22}H_{41}SiPO_5$: 6.3% Si; 7.0% P. Found: 5.6% Si; 6.8% P.

Example 4

A reaction flask was charged with dimethyl phosphonate (330 g., 3.0 moles) and heated to 140° C. A dropping funnel was charged with a mixture of vinyltriethoxysilane (570 g., 3.0 moles) and di-tertiarybutyl peroxide (72 g.). The dropping funnel was inserted into the reaction flask so that the tip of the funnel was below the surface of the dimethyl phosphonate. The vinyltriethoxysilane-peroxide mixture was then added at a rate of about 5 cc. per minute. The reaction was exothermic; therefore, no external heat had to be applied during the addition to maintain the temperature at 135–145° C. Upon the completion of the addition of the vinyltriethoxysilane-peroxide mixture, the resultant reaction mixture was heated at 138° C.–147° C. for four hours. The reaction mixture was then distilled under reduced pressure to give a greater than 60% yield of product, dimethoxyphosphinylethyltriethoxysilane, (B.P. 143° C. at 5 mm. Hg, $n_D^{25}$ =1.4237, specific gravity 1.067). Elemental analysis confirmed the product to be dimethoxyphosphinylethyltriethoxysilane $[(CH_3O)_2P(O)C_2H_4Si(OC_2H_5)_3]$.

Example 5

A reaction flask was charged with dimethyl phosphonate (275 g., 2.5 moles) and heated to 140° C. A dropping funnel was charged with a mixture of methylvinyldiethoxysilane (400 g., 2.5 moles) and di-tertiarybutyl peroxide (54 g. ). The dropping funnel was inserted into the reaction flask so that the tip of the funnel was below the surface of the dimethyl phosphonate. The methylvinyldiethoxysilane-peroxide mixture was then added at a rate of about 5 cc. per minute. The reatcion was exothermic; therefore, no external heat had to be applied during the addition to maintain the temperature at 135–145° C. Upon the completion of the addition of the methylvinyldiethoxysilane-peroxide mixture, the resultant reaction mixture was heated at 138–147° C. for five hours. The reaction mixture was then distilled under reduced pressure to give a 50% yield of product, based on the weight of the starting materials. Elemental analysis confirmed the product to be dimethoxyphosphinylethylmethyldiethoxysilane, $$[(CH_3O)_2P(O)C_2H_4Si(CH_3)(OC_2H_5)_2]$$

(B.P. 133° C. at 5 mm. Hg, $n_D^{25}$=1.4300).

Example 6

A reaction flask was charged with dimethyl phosphonate (161 g., 1.46 moles) and heated to 140° C. A dropping funnel was charged with a mixture of vinyldimethylethoxysilane (190 g., 1.46 moles) and di-tertiarybutyl peroxide (28 g.). The dropping funnel was inserted into the reaction flask so that the tip of the funnel was below the surface of the dimethyl phosphonate. The vinyldimethylethoxysilane-peroxide mixture was then added at a rate of about 5 cc. per minute. The reaction was exothermic; therefore, no external heat had to be applied during the addition to maintain the temperature at 135–145° C. Upon the completion of the addition of the vinyldimethylethoxysilane-peroxide mixture, the resultant reaction mixture was heated at 138–147° C. for three hours. The reaction mixture was then distilled under reduced pressure to give a 60% yield of product, dimethoxyphosphinylethyldimethylethoxysilane (B.P. 119° C. at 0.5 mm. Hg, $n_D^{25}$ 1.4341; specific gravity 1.037). Elemental analysis confirmed the product to be dimethoxyphosphinylethyldimethylethoxysilane $$([CH_3O]_2{-}P(O){-}C_2H_4{-}Si(CH_3)_2{-}OC_2H_5)$$

Example 7

A reaction flask was charged with dimethyl phosphonate (220 g., 2.0 moles) and heated to 140° C. A dropping funnel was charged with a mixture of 2-butenyltriethoxysilane (434 g., 2.0 moles) and di-tertiarybutyl peroxide (52.5 g.). The dropping funnel was inserted into the reaction flask so that the tip of the funnel was below the surface of the dimethyl phosphonate. The 2-butenyltriethoxysilane-peroxide mixture was then added at a rate of about 5 cc. per minute. The reaction was slightly exothermic; however, external heat had to be applied during the addition to maintain the temperature at 135–145° C. Upon the completion of the addition of the 2-butenyltriethoxysilane-peroxide mixture, the resultant reaction mixture was heated at 138–147° C. for four hours. The reaction mixture was then distilled under reduced pressure to give a 60.5% yield of product, the beta and gamma isomers of dimethoxyphosphinyl-butyltriethoxysilane (B.P. 148° C. at 5 mm. Hg, $n_D^{25}$ 1.4229; specific gravity 1.053). Elemental analysis confirmed the product to be dimethoxyphosphinylbutyltriethoxysilane [(CH$_3$O)$_2$P(O)C$_4$H$_8$Si(OC$_2$H$_5$)$_3$].

*Example 8*

Methylvinyldiethoxysilane (160 g., 1.0 mole), dimethyl phosphonate (225 g., 2.05 moles) and di-tertiary-butyl peroxide (12 g.) were charged into a one liter flask and heated slowly. When the temperature reached about 110° C. it rose very rapidly to about 175° C. The reaction mixture was allowed to cool to 160° C. The reaction mixture was heated at 160° C. for an additional four hours. The reaction mixture was then distilled under reduced pressure to give 132.5 grams (49% yield) of [beta-(dimethoxyphosphinyl)ethyl]methyl-diethoxy silane.

A comparison of the yields of Example 8 and Example 1 shows that the improved method of this invention gives yields that are almost one and a half times those obtained by other methods. This is even more remarkable when it is noted that in Example 8 a 100% excess of dimethyl phosphonate was used, thereby favoring greater yields. Example 1 does not employ such an excess of the phosphonate.

What is claimed is:

1. An improved process for the production of phosphorus containing organosilicon compounds in which the phosphorus is interconnected to silicon through a divalent saturated hydrocarbon group selected from the class consisting of saturated aliphatic and alicyclic hydrocarbon groups which comprises (1) forming a mixture of a free radical forming catalyst and an organosilicon compound containing at least one silicon atom and at least one silicon-bonded ethylenically unsaturated group selected from the class consisting of ethylenically unsaturated aliphatic and alicyclic hydrocarbon groups, each silicon atom being bonded to from 1 to 3 oxygen atoms, each of said oxygen atoms being bonded to an element selected from the class consisting of silicon and carbon of a monovalent hydrocarbon group and each remaining unfilled valence of each silicon atom being satisfied by a group selected from the class consisting of monovalent hydrocarbon group and halogenated monovalent hydrocarbon groups and adding said mixture to (2) a phosphorus compound of the formula

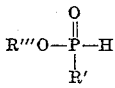

wherein R' is a member of the class consisting of hydrogen, hydrocarbyl, halogenated hydrocarbyl, hydrocarbyloxy, and halogenated hydrocarbyloxy groups and R''' is a member of the class consisting of hydrocarbyl and halogenated hydrocarbyl groups, while maintaining said phosphorus compound at a temperature sufficiently elevated to cause said phosphorus compound and said organosilicon compound to react to produce said phosphorus-containing organosilicon compound.

2. An improved process for producing phosphorus-containing organosilanes of the formula:

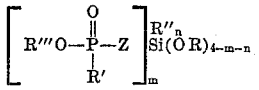

wherein R is a hydrocarbyl group, R' is a member of the class consisting of hydrogen, hydrocarbyl, hydrocarbyloxy, halohydrocarbyl, and halohydrocarbyloxy, R'' and R''' are members of the class consisting of hydrocarbyl and halohydrocarbyl, z is a member of the class consisting of aliphatic and alicyclic hydrocarbon groups containing at least two carbon atoms, (m) is an integer of from 1 through 3, (n) is an integer of from 0 through 2, and the sum of m+n is not greater than 3, which comprises (1) forming mixture of a free radical addition catalyst and an organosilane of the formula:

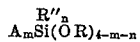

wherein R, R'', (m) and (n) have the above defined meaning, and A is an ethylenically unsaturated group selected from the class consisting of ethylenically unsaturated aliphatic and alicyclic hydrocarbon groups, and adding said mixture to (2) a phosphorus compound of the formula:

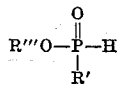

wherein R' is a member of the class consisting of hydrogen, hydrocarbyl, halogenated hydrocarbyl, hydrocarbyloxy, and halogenated hydrocarbyloxy groups and R''' is a member of the class consisting of hydrocarbyl and halogenated hydrocarbyl groups, while maintaining said phosphorus compound at a temperature sufficiently elevated to cause said phosphorus compound and said organosilicon compound to react to produce said phosphorus-containing organosilanes.

3. An improved process for producing phosphorus-containing organosiloxanes containing units of the formula:

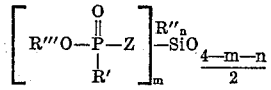

wherein R' is a member of the class consisting of hydrogen, hydrocarbyl, hydrocarbyloxy, halohydrocarbyl and halohydrocarbyloxy, R'' and R''' are members of the class consisting of hydrocarbyl and halohydrocarbyl, Z is a member of the class consisting of aliphatic and alicyclic hydrocarbon groups containing at least two carbon atoms, (m) is an integer of from 1 through 3, (n) is an integer of from 0 through 2 and the sum of m+n is not greater than 3, which comprises (1) forming a mixture of a free radical addition catalyst and an organosiloxane of the formula:

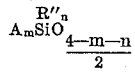

wherein R'', (m) and (n) have the above-defined meanings and A is an ethylenically unsaturated group selected from the class consisting of ethylenically unsaturated aliphatic and alicyclic hydrocarbon groups, and adding said mixture to (2) a phosphorus compound of the formula:

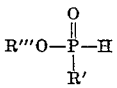

wherein R' is a member of the class consisting of hydrogen, hydrocarbyl, halogenated hydrocarbyl, hydrocarbyloxy, and halogenated hydrocarbyloxy groups and R''' is a member of the class consisting of hydrocarbyl and halogenated hydrocarbyl groups, while maintaining said phosphorus compound at a temperature sufficiently elevated to cause said phosphorus compound and said organosilicon compound to react to produce said phosphorus-containing organosilanes.

4. An improved process for producing phosphorus-containing organosiloxanes containing at least one unit of the formula:

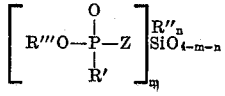

and at least one unit of the formula:

$$R''_x SiO_{\frac{4-x}{2}}$$

wherein R' is a member of the class consisting of hydrogen, hydrocarbyl, hydrocarbyloxy, halohydrocarbyl, and halohydrocarbyloxy, R'' and R''' are members of the class consisting of hydrocarbyl and halohydrocarbyl, Z is a member of the class consisting of aliphatic and alicyclic hydrocarbon groups containing at least two carbon atoms, (m) is an integer of from 1 through 3, (n) is an integer of from 0 through 2, the sum of m+n is not greater than 3 and x is an integer of from 0 through 3, which comprises (1) forming a mixture of a free radical addition catalyst and an organosiloxane containing at least one unit of the formula:

$$A_m SiO_{\frac{4-m-n}{2}}^{R''_n}$$

and at least one unit of the formula:

$$R''_x SiO_{\frac{4-x}{2}}$$

wherein R'', (x), (m), and (n) have the above-defined meanings and A is an ethylenically unsaturated group selected from the class consisting of ethylenically unsaturated aliphatic and alicyclic hydrocarbon groups, and adding said mixture to (2) a phosphorus compound of the formula:

$$R'''O-\overset{\overset{O}{\|}}{\underset{R'}{P}}-H$$

wherein R' is a member of the class consisting of hydrogen, hydrocarbyl, halogenated hydrocarbyl, hydrocarbyloxy, and halogenated hydrocarbyloxy groups and R''' is a member of the class consisting of hydrocarbyl and halogenated hydrocarbyl groups, while maintaining said phosphorus compound at a temperature sufficiently elevated to cause said phosphorus compound and said organosilicon compound to react to produce said phosphorus-containing organosilanes.

5. A process as claimed in claim 1 in which the free radical addition catalyst is di-tertiarybutyl peroxide.

6. An improved process for producing (dimethoxyphosphinyl)ethyl(methyl)diethoxysilane which comprises forming a mixture of methyl vinyl diethoxysilane and a free radical addition catalyst and adding said mixture to dimethyl phosphonate while maintaining said dimethyl phosphonate at a temperature sufficiently elevated to cause said dimethyl phosphonate and said methylvinyldiethoxysilane to react to produce said (dimethoxyphosphinyl)ethyl(methyl)diethoxysilane.

7. A process as claimed in claim 6 wherein the free radical addition catalyst is ditertiary butyl peroxide.

8. An improved process for producing (dimethoxyphosphinyl)ethyltriethoxysilane which comprises forming a mixture of vinyltriethoxysilane and a free radical addition catalyst and adding said mixture to dimethyl phosphonate while maintaining said dimethyl phosphonate at a temperaturee sufficiently elevated to cause said dimethyl phosphonate and said vinyltriethoxy silane to react to produce said (dimethoxyphosphinyl)ethyltriethoxysilane.

9. A process as claimed in claim 8 wherein the free radical addition catalyst is ditertiarybutylperoxide.

10. An improved process for producing [(phenyl)octyloxyphosphinylethyl]triethoxysilane which comprises forming a mixture of vinyltriethoxy silane and a free radical addition catalyst and adding said mixture to octyl phenylphosphinate while maintaining said octyl phenylphosphinate at a temperature sufficiently elevated to cause said octyl phenylphosphinate and said vinyldiethoxysilane to react to produce said octyloxy phenyl phosphinyl ethyltriethoxysilane.

11. A process as claimed in claim 10 wherein the free radical addition catalyst is ditertiarybutyl peroxide.

References Cited in the file of this patent
UNITED STATES PATENTS
2,843,615      Linville _____ July 15, 1950

UNITED STATES PATENT OFFICE
CERTIFICATION OF CORRECTION

Patent No. 2,963,503                                            December 6, 1960

James G. Marsden

It is hereby certified that error appears in the above numbered patent requiring correction and that the said Letters Patent should read as corrected below.

Column 1, line 62, for "Si=" both occurrences, read -- $Si\equiv$ --; column 4, line 37, for "r″", in italics, read -- $R''$ --; column 10, line 1, for "z", in italics, read -- $Z$ --; line 74, right-hand portion of the formula, for "4-m-n" read -- $\frac{4-m-n}{2}$ --.

Signed and sealed this 17th day of April 1962.

(SEAL)
Attest:

ESTON G. JOHNSON                             DAVID L. LADD
Attesting Officer                            Commissioner of Patents